United States Patent [19]
Meidan

[11] Patent Number: 5,136,232
[45] Date of Patent: Aug. 4, 1992

[54] AUTOMATIC ON SWITCH AND BATTERY PROTECTOR

[76] Inventor: Daniel Meidan, 90 Elise Terrace, North York, Ontario, Canada, M2R 2X1

[21] Appl. No.: 552,040

[22] Filed: Jul. 13, 1990

[51] Int. Cl.[5] .............................................. H02J 1/00
[52] U.S. Cl. ......................................... 322/8; 322/28; 307/107
[58] Field of Search ..................... 322/7, 8, 12, 28; 307/10.7; 320/13, 61

[56] References Cited

U.S. PATENT DOCUMENTS

| | | | |
|---|---|---|---|
| 3,757,199 | 9/1973 | Minks | 322/28 |
| 4,088,940 | 5/1978 | Ciamiello et al. | 322/8 |
| 4,137,557 | 1/1979 | Ciarniello et al. | 307/10.7 X |
| 4,323,837 | 6/1982 | Nakamura et al. | 322/7 |
| 4,346,338 | 8/1982 | Nakamoto et al. | 322/28 |
| 4,488,105 | 12/1984 | Pappzian | 322/28 X |
| 4,629,967 | 12/1986 | Voss | 322/28 |
| 4,739,243 | 8/1988 | Iwatani et al. | 322/28 X |
| 4,831,322 | 5/1989 | Mashino et al. | 322/28 |
| 4,862,055 | 8/1989 | Maruyama et al. | 322/8 |

Primary Examiner—Steven L. Stephan
Assistant Examiner—Kristine Peckman
Attorney, Agent, or Firm—Kenneth M. Garrett

[57] ABSTRACT

A battery protector/automatic ON switching device comprises a first terminal for connecting to the generator output of the vehicle and a second terminal for connecting to the input pole of the vehicle battery, and a diode serially connecting the first and second terminals to permit a charging current to flow to the battery and block current flow in the reverse direction. A third terminal for connection to a load circuit of the vehicle connects to the first terminal through an automatic switch which will switch on the ON condition only when at least a threshold voltage sufficient to excite the genertor to its full output is experienced at the first terminal. The first terminal connects directly to a dummy pole that may be gripped by a booster cable for providing a booster charge to another battery. The diode prevents current flow from the battery of the source vehicle and the inadvertent damage thereof.

13 Claims, 3 Drawing Sheets

AUTOMATIC ON SWITCH AND BATTERY PROTECTOR

FIELD OF INVENTION

This invention relates to a device having application to automotive vehicles, although it is not necessarily restricted thereto. It particularly relates to a device which has utility in providing "automatic on" headlamps, or for the automatic switching of other load circuits while protecting the battery from inadvertent discharge. It has still further utility in isolating the vehicle battery when providing a booster charge to another battery.

BACKGROUND ON INVENTION

In many countries it is a recommended practice to illuminate vehicle headlamps when driving on the highway during daylight hours. Most "automatic on" headlight devices of the prior art derive their power from the vehicle battery, and include an automatic switch in parallel to the manual switch normally provided for controlling the headlamps. The automatic switch in one form thereof is conditioned to ON by means which is responsive to a voltage at the battery terminals above a threshold value. Accordingly, different devices will normally be required according to the distribution voltage of the vehicle system. In another form of automatic switch this is conditioned to ON by means which is responsive to a voltage at the ignition coil of the vehicle. Where the power reserve of the battery is low or becomes low, the foregoing devices will result in an undesirable drain.

In U.S. Pat. No. 4,323,837 there is described a power supply arrangement for vehicles including a generator (which term as is used herein includes dynamos and alternators or the like) driven by the engine of the vehicle and a battery, wherein the output of the generator is connected to the battery through a diode serving to pass a charging current to the battery and block the flow of current in a reverse direction. Essential loads such as the vehicle ignition are connected to the battery and powered thereby, whereas non-essential loads which may include lamps are connected to the generator output and derive their power solely therefrom.

The output of the generator is governed primarily by a voltage regulator. Certain regulators require the presence of a threshold voltage at the generator output terminal in order to condition the generator to provide a full, regulated output. Such threshold voltage is normally provided by the battery, or where the battery is discharged or effectively disconnected by a blocking diode, for example, it may be provided by the generator itself, relying on weak residual magnetic fields normally present therein. However, if a heavy electrical load is permanently connected to the generator output, this may prevent the necessary attainment of the threshold voltage.

Where the load circuit is powered solely from the generator output, the power available to the load circuit will be somewhat dependent upon the engine speed of the vehicle. Where the load is a headlamp, the light output may be insufficient under certain conditions, and pose a safety hazard. While in the foregoing patent a servo mechanism is described to overcome this, additional circuitry is required which would preclude the load from being directly connected to the generator output.

It is desired on occasion to provide a booster charge for a battery of another vehicle. Where the batteries are directly interconnected using booster cables or the like, a high and uncontrolled current may be drawn from the source battery, which may result in damage.

It is an object of my invention to provide an automatic on switch that is relatively insensitive to the distribution voltage of the vehicle.

It is another object of my invention to provide an automatic on switch the output of which may be permanently connected to the load and yet which will not prevent the generator being conditioned to provide its full output.

It is still another object of my invention to provide an automatic on switch in accordance with the foregoing objects that may be connected in parallel with a manual switch therefor to optionally connect the load to a battery.

It is a further object of my invention to provide an automatic on switch in accordance with the foregoing objects that is simple and economically produced.

It is yet another object of my invention to provide a device to facilitate booster charging of another battery not normally connected to the power supply system of the vehicle, while protecting the battery thereof.

SUMMARY OF THE INVENTION

In accordance with one aspect of the invention, a battery protector/automatic switch for use in an electrical circuit including a generator having an output terminal, a storage battery, an electrical load and typically an ON-OFF switch for connecting the load across the battery comprises a first terminal for connecting to the output terminal of the generator; a second terminal for connecting to one pole of the battery; a third terminal for connecting to the load in parallel to the ON-OFF switch, a diode connected between the first and second terminals poled to conduct a charging current from the generator to the battery and block current flow in a reverse direction; and switch means interposed between the first and third terminals, the switch means serving to block the flow of current to the third terminal when the generator is first actuated, so permitting a threshold voltage to be reached at the first terminal serving to condition the generator towards its full output, and thereafter conduct a flow of current between the first and third terminals.

In accordance with a preferred, illustrative embodiment of the invention, the switch means comprises a silicon controlled rectified (hereinafter referred to as SCR), but other solid state switches, for example triacs and power transistors, may also be suited. Generally speaking, such solid state switches may be selected whereby they will not switch to the ON condition until the threshold voltage has been significantly exceeded, and they may be relatively independent of the distribution voltage of the system.

The automatic switch means is not limited to solid state switches, however, and under some circumstances electromechanical switches may be preferred, either above or in combination with an electronic switch, and still other automatic switch means will occur to those skilled in the art.

While it appears to be most expedient that the automatic switch means be conditioned ON by sensing the presence of a voltage in excess of the threshold voltage at the first terminal, it will be appreciated by persons skilled in the art that the threshold voltage will normally be present within a very short time period from the commencement of operation of the generator. Accordingly, under some circumstances it may be preferable to provide an automatic switch which is conditioned to ON merely after an appropriate time delay.

In accordance with another aspect of the invention, the battery protector includes a dummy pole connected electrically to the input of the diode, to provide a mechanical and electrical connection for a booster cable in the event that it is desired to provide a booster charge to another battery not normally associated with the source vehicle. Normally the diode is mounted on a heat sink which may conveniently serve as an electrical bus connected to the first terminal, and the dummy pole is preferably formed as a unitary part of the bus. The diode blocks the flow of current from the battery of the source vehicle to the battery to be boosted, thereby protecting the source battery from inadvertent damage. The current output from the dummy pole to the second battery is derived solely from the generator of the vehicle, and is at all times under the control of the voltage regulator thereof.

The foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
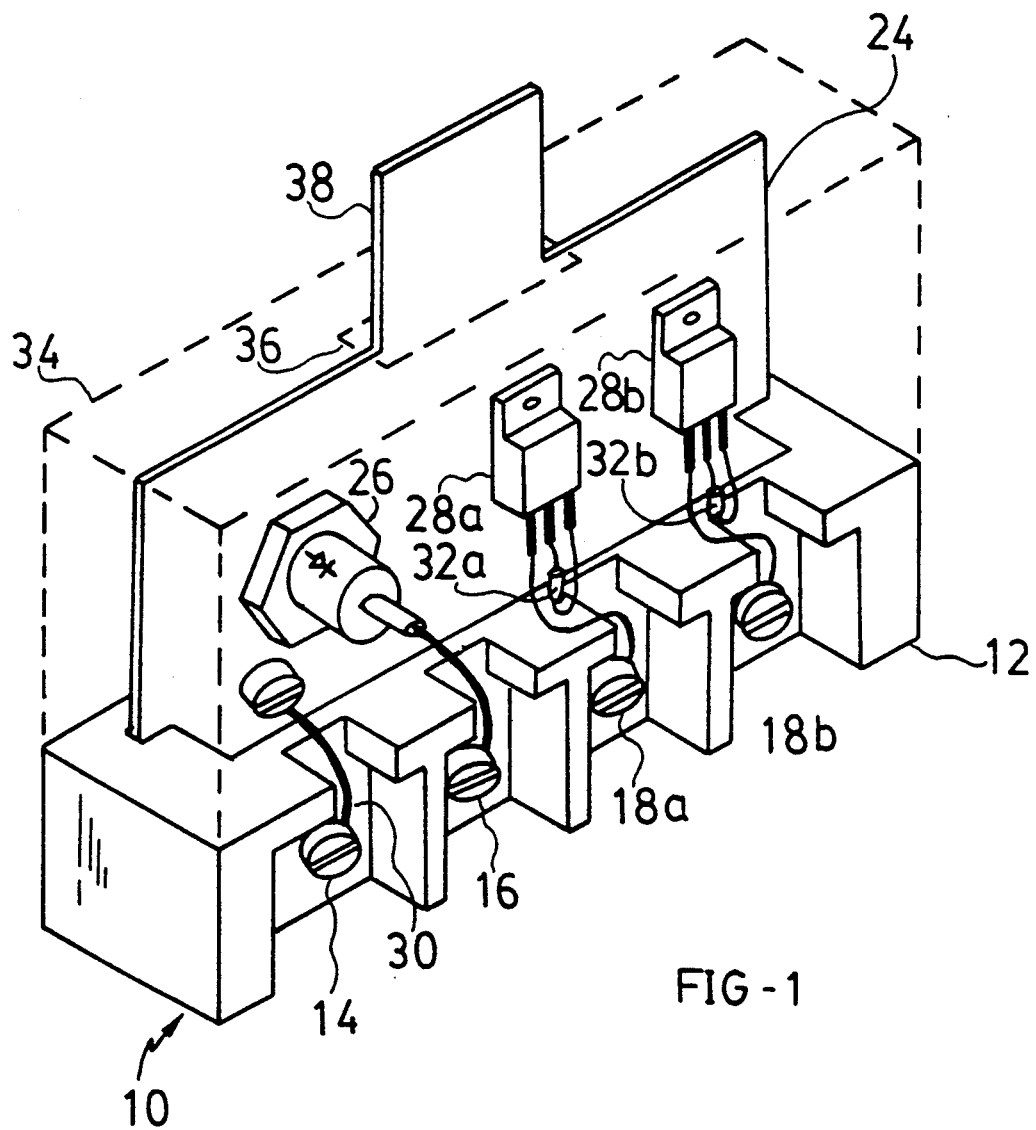
FIG. 1 is an isometric view of one embodiment of the invention with a portion thereof shown in dashed outline to reveal interior detail.

Referring to the drawings in detail, an automatic switch in accordance with the invention is identified in FIG. 1 by the numeral 10. Switch 10 comprises a base 12 of electrically insulating material having four terminals thereon respectively identified by the numerals 14, 16, 18a and 18b. A heat sink 24 is mounted from base 12. Secured to heat sink 24 in heat conducting relationship is a diode device 26 and a pair of similar SCR devices 28a, 28b. Expediently, and as will be evident from FIG. 2, the anode of each of devices 26, 28a and 28b is also electrically connected to heat sink 24, where by this element will also function as an electrical bus. Accordingly, heat sink 24 may also on occasion be described throughout this description as bus 24, depending upon which function is in question. Terminal 14 is connected to bus 24 by conductor 30, and the cathode of each of devices 26, 28a and 28b is respectively connected to terminals 16, 18a and 18b. A firing resistor 32a, 32b connects the gate of SCR devices 28a, 28b to their respective anodes.

Device 10 further comprises an insulating housing shown in dashed outline and indicated by the numeral 34. Housing 34 has an opening 36 in one face thereof through which a dummy pole formed as a tab extension 38 of bus 24 projects outwardly.

Figure 2:
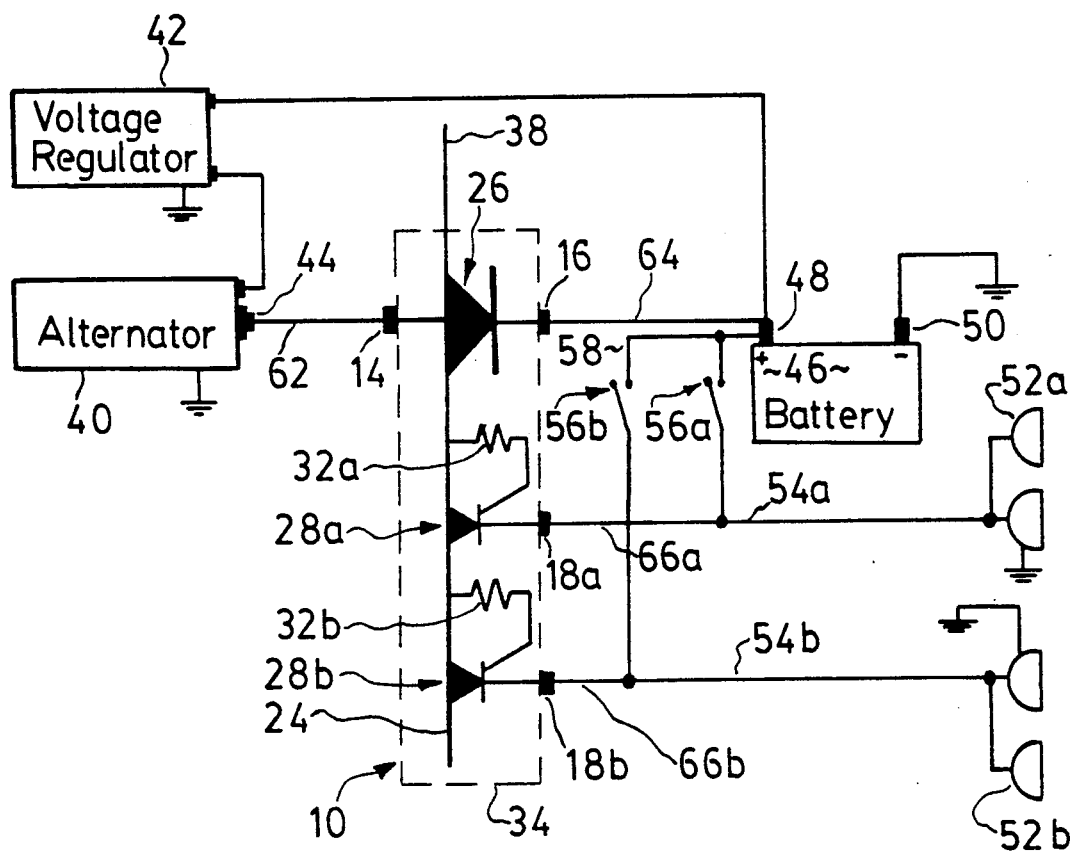
FIG. 2 is a circuit diagram showing a power distribution system using the embodiment of FIG. 1.

Referring more particularly to FIG. 2, an electrical distribution system of a vehicle typically comprises an alternator 40 having an output terminal 44, and an associated voltage regulator 42, a battery 46 having a positive pole 48 and a negative pole 50, the latter being grounded to the chassis of the vehicle. The electrical system further includes a first load comprising headlamps 52a, and a second load comprising parking lights 52b, the low side of each load being connected to the chassis, the high side of each load being respectively connected through conductors 54a, 54b to manually operable ON-OFF switches 56a, 56b and thence via conductor 58 to positive pole 48 of battery 46, to complete the circuit. Normally, alternator output terminal 44 would connect directly to the positive pole 48 of battery 46 to receive the full charge therefrom.

In accordance with my invention, alternator output terminal 44 is connected to terminal 14 by conductor 62 and positive pole 48 of battery 46 is connected to terminal 16 by conductor 64, thereby interposing diode 26 in the battery charging circuit whereby it will conduct a charging current, but block current flow in the reverse direction. Conductors 66a, 66b respectively connect terminals 18a, 18b to loads 52a, 52b in parallel to switches 56a, 56b.

Considering now the operation of the circuit of FIG. 2, when alternator 40 is at rest, there will be no voltage present at terminal 44 and on bus 24. Loads 52a, 52b may be turned ON or OFF by switches 56a, 56b as desired by the vehicle operator. When alternator 40 is subsequently rotated a small voltage will initially be experienced at terminal 44 and on bus 24. Diode 26 will only conduct when the forward voltage exceeds the reverse voltage provided by battery 46. In the event that both switches 56a, 56b are closed, or either of them, the SCR 28a, 28b associated therewith will similarly be initially reverse biased, and will not conduct. Accordingly, the total initial output of alternator 40 is available for use by regulator 42 to bootstrap alternator 40 towards full output. Assuming in this initial period of operation of alternator 40 that switches 56a, 56b are open, as would normally be the case, the voltage on conductors 66a, 66b will be zero, and each SCR 28a, 28b will be forward biased. However, they will not conduct until such time as the current flow through resistors 32a, 32b associated with each SCR 28a, 28b exceeds that required for operating the gate thereof. Typically resistors 32a, 32b will have a value of about several hundred ohms, and SCRs 28a, 28b will be conditioned to an ON state only when the voltage at terminal 14 is well in excess of the threshold voltage necessary to bootstep alternator 40 towards production of its full output as determined by regulator 42. When SCRs 28a, 28b are gated ON, loads 52a, 52b will be automatically illuminated solely from the current supplied by alternator 40 for such time as switches 56a, 56b remain open, which is solely at the discretion of the vehicle operator, whereby they will not create a current drain from battery 46. In the event that the power output from alternator 40 is insufficient to maintain the desired luminosity of loads 52a, 52b, or indeed at any other time, switches 56a, 56b may be closed to provide a current flow through conductor 58 to the loads.

Considering now the operation of device 10 as it relates to providing a booster charge to a battery of, for example another vehicle, tab 38 of bus 24 may be connected by a booster cable to provide a direct output from alternator 40 available for charging the other battery. At all times, the current output through tab 38 is subject to control by regulator 42, and diode 26 acts to block the flow of current from battery 46, so providing protection therefor.

Figure 3:
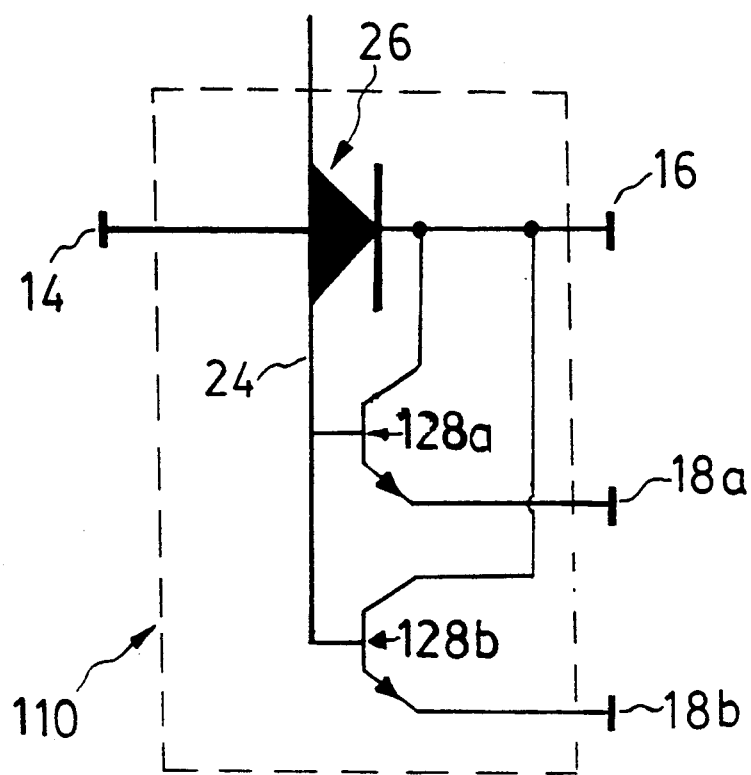
FIG. 3 is a circuit diagram of an alternative embodiment of the invention.

It will be apparent that the delay of a output of a voltage to terminals 18a, 18b until such time as a threshold voltage is output from alternator 40 sufficient to bootstrap the alternator towards its full output may be effected other than by use of SCR devices. In a second embodiment 110, of the invention shown in FIG. 3, the SCRs 28a, 28b of FIG. 2 are replaced by NPN power transistors 128a, 128b, the base of which connects to bus 24 and the emitter to terminals 18a, 18b. Transistors 128a, 128b will only conduct power to terminals 18a, 18b when the voltage across the base-emitter junctions is well in excess of the threshold voltage required to bootstrap alternator 40 towards its full output.

It will be recognized that the specific embodiments set forth are merely illustrative. For example, the number of outputs at terminals such as 18a, 18b may be decreased to one or increased as desired by including other devices in parallel to SCRs 28a, 28b or their functional equivalents.

Still further, in certain countries the polarity of the entire power distribution system of vehicles is reversed from that illustrated, hence the polarities of devices such as 26 and 28 would be similarly reversed.

It will be apparent that many changes may be made to the illustrative embodiment, while falling within the scope of the invention and it is intended that all such changes be covered by the claims appended hereto.

I claim:

1. In an electrical circuit comprising a generator having an output terminal; a battery having an input pole and an output pole; a diode connecting said input pole to said output terminal to permit the flow of charging current from said generator to said battery and to block the flow of current in the reverse direction; an electrical load having electrically opposed sides, one side thereof being connected to said output pole; an on-off switch serially connecting the other side of said load to said input pole;

the improvement comprising automatic switch means connecting said output terminal to said other side of said load in parallel to said on-off switch;
said automatic switch means serving to block the flow of current therethrough when said generator is first energized to permit at least a threshold voltage to be reached at said output terminal, and to conduct a flow of current upon attainment of said threshold voltage.

2. An electrical circuit as defined in claim 1, wherein said automatic switch means comprises a solid state switch.

3. An electrical circuit as defined in claim 2, wherein said solid state switch is selected from an SCR switch, a triac switch and a power transistor switch.

4. An automatic switching device for use in an electrical circuit, said circuit including a generator having an output terminal; a storage battery for receiving a charge from said generator, said storage battery having a first pole normally connected to said generator output terminal and a second pole; an electrical load; circuit means including on-off switch means serially connecting said load on one side thereof to said first pole and a conductor connecting said load on the other side thereof to said second pole; said automatic switching device comprising:

a first terminal for connecting to said output terminal of said generator;
a second terminal for connecting to said first pole of said battery;
a diode connected between said first and second terminals in a manner to permit a charging current from said generator to flow through said battery and to block current flow in a reverse direction;
a third terminal for connecting to said load in parallel connection to said on-off switch means; and
automatic switch means serially interposed between said first and third terminals; said automatic switch means serving to block the flow of current between said first and third terminals when said generator is first actuated and thereby to permit a threshold voltage to be reached at said output terminal, and thereafter to conduct a flow of current between said first and third terminals.

5. An automatic switching device as defined in claim 4, wherein said automatic switch means comprises a solid state switch.

6. An automatic switching device as defined in claim 5, wherein said solid state switch is selected from an SCR switch, a triac switch and a power transistor switch.

7. An automatic switching device as defined in claim 5, including a unitary heat sink upon which said diode and said solid state switch are mounted.

8. An automatic switching device as defined in claim 7, wherein said heat sink serves as an electrical bus to which said first terminal is connected.

9. An automatic switching device as defined in claim 8, further including a housing therefor, wherein said electrical bus includes a portion projecting outwardly of said housing for grasping by a booster cable clamp to form an electrical connection therewith.

10. An automatic switching device as defined in claim 4, further including a dummy pole electrically connected to said first terminal to provide an electrical and mechanical connection for a booster cable clamp.

11. A battery protector for use in an electrical circuit including a generator having an output terminal and a battery having an input pole, said protector comprising:

a first terminal for connecting to said generator output terminal;
a second terminal for connection to said battery input pole;
a diode connected between said first and second terminals poled to pass a charging current from said generator to said battery and to block the flow of current in a reverse direction, and
a dummy pole connected to said first terminal to provide a mechanical and electrical connection for a booster cable clamp.

12. A battery protector as defined in claim 11, wherein said dummy pole acts as a heat sink for said diode, and where said first terminal is electrically connected to said dummy pole.

13. A battery protector as defined in claim 13, including a housing therefor, and wherein said dummy pole projects beyond the confines of said housing.

* * * * *